Patented July 18, 1950

2,515,198

UNITED STATES PATENT OFFICE 2,515,198

HERBICIDES

Robert C. Dosser and Amerst E. Colby, Midland, Mich., assignors to The Dow Chemical Company, Midland, Mich., a corporation of Delaware No Drawing. Application May 28, 1948, Serial No. 29,926

9 Claims. (Cl. 167—45)

This invention relates to herbicides and is particularly concerned with aqueous sprays and with methods and concentrates for their production.

In recent years the chlorophenoxy-acetic acids such as 4-chlorophenoxy-acetic, 2,4-dichlorophenoxy-acetic acid, and 2,4,5-trichlorophenoxy-acetic acid, have been used for killing weeds. In such use the acids often are employed in the form of dilute aqueous solutions of their alkanolamine salts. The dilute aqueous spray compositions have conveniently been prepared by diluting aqueous concentrates of the amine salts with the water immediately available. These aqueous concentrates may contain as much as 40 to 70 per cent by weight of the alkanolamine salt.

One of the difficulties encountered in such operation has been the formation of water-insoluble aggregates upon dilution of the concentrate. Thus, when a 40 to 70 per cent by weight alkanolamine salt concentrate is mixed with hard water, a heavy flocculent precipitate is frequently formed. This precipitate is dispersed throughout the spray, and clogs spraying equipment with such rapidity that at times the application of only small volumes of spray is possible before nozzle and filter cleaning operations become necessary. The time consumed and expense involved in intermittent dismantling and cleaning of equipment, limit the use of the alkanolamine salts of the chlorophenoxy-acetic acids in large scale programs.

An object of this invention is the provision of aqueous herbicide sprays comprising alkanolamine salts of chlorophenoxy-acetic acids, which sprays will be free of water-insoluble constituents and be adapted to be employed in usual spraying equipment. An additional object is the provision of a concentrate for the production of such aggregate-free aqueous herbicide sprays. A further object is to provide a method for preventing the precipitation of water-insoluble aggregates in the production of aqueous sprays for concentrates comprising alkanolamine salts of chlorophenoxy-acetic acids. Other objects will become apparent from the following specification.

According to this invention, we have discovered that, when a small amount of a water-soluble methyl cellulose is present in an aqueous spray comprising an alkanolamine salt of a chlorophenoxy-acetic acid and a water of any usual hardness, the spray is substantially free of water-insoluble aggregates, and may be applied to plant surfaces with conventional spraying equipment without clogging nozzles and screens. The amount of the methyl cellulose incorporated in the ultimate spray mixture varies somewhat with the particular amine salt toxicant employed, and the degree of hardness of the water present in the composition. Good sprays are obtained when the methyl cellulose is employed in the amount of from 0.01 to 2.0 per cent by weight of the alkanolamine salt present in the composition. Larger amounts of the agent may be employed where increased viscosity of the spray is not objectionable.

The water-soluble methyl cellulose employed above is a white fibrous material, completely soluble in cold water, and insoluble in most organic solvents. Its aqueous solutions are non-toxic, odorless, tasteless, neutral, stable to light, and not affected by changes in acidity or alkalinity over a wide pH range. The degree of methylation of this material is from 29 to 32 per cent. This methyl cellulose is a commercial product sold in different viscosity types. The ether products most advantageously employed in the compositions and methods herein disclosed, are characterized by viscosities of from 10 to 100 centipoises in 2 per cent aqueous solution at 20° C.

In one aspect, this invention is a method for producing precipitate-free aqueous herbicide sprays from an aqueous concentrate comprising an alkanolamine salt of a chlorophenoxy-acetic acid. In this method, good results are obtained when the required amount of methyl cellulose is dissolved in the concentrate and the latter diluted to the desired concentration. An alternative procedure consists in dispersing the methyl cellulose in the bulk of the water to be employed in the dilution of the amine salt. An aqueous solution of from 0.5 to 6 per cent of the methyl cellulose is a convenient form in which the latter may be employed.

The invention also consists in an improved aqueous herbicide concentrate, comprising methyl cellulose and an alkanolamine salt of a chlorophenoxy-acetic acid. Such concentrates are prepared by reacting the chlorophenoxy-acetic acid with a quantity of an alkanolamine sufficient to neutralize the acid in the presence of water as a solvent. The reaction takes place on contact at room temperature. In practice, the alkanolamine is first dissolved in the water and the chlorophenoxy-acetic acid added portionwise with stirring. The desired amount of methyl cellulose dissolved in water is then added to the mixture. The resulting solution is agitated to disperse the methyl cellulose and then diluted with water to form concentrates containing the amine salt in any desired concentration.

Example 1

An aqueous solution of the triethanolamine salt of 2,4-dichlorophenoxy-acetic acid was prepared by reacting substantially equimolecular proportions of triethanolamine and 2,4-dichlorophenoxy-acetic acid in the presence of water at room temperature. The triethanolamine was dissolved in water and the 2,4-dichlorophenoxy-acetic acid added portionwise with stirring until the pH of the resulting solution was 7.0. A 6 per cent aqueous solution of methyl cellulose (15 centipoises viscosity in 2 per cent by weight aqueous solution at 20° C.) was then added to the mixture in an amount equal to 0.012 per cent by weight of the triethanolamine salt present. The resulting solution was stirred for ¼ hour to disperse the methyl cellulose, and subsequently diluted with water to produce a concentrate containing 67 per cent by weight of the triethanolamine salt.

In an exactly comparative operation, triethanolamine and 2,4-dichlorophenoxy-acetic acid were reacted and diluted with water to produce a 67 per cent by weight amine salt concentrate in which methyl cellulose was not included.

Portions of the two concentrates were diluted with water to produce sprays containing 12.5 pounds by weight of the triethanolamine salt in 30 gallons of solution. The water employed had a hardness of 400 parts per million, expressed as calcium carbonate. The sprays were thoroughly agitated and 800 milliliter portions of each placed in one liter sedimentation cones. After 72 hours' standing, 3 milliliters of flocculent precipitate was found in the cone containing the spray comprising the unmodified triethanolamine salt solution. The spray comprising the amine salt and methyl cellulose was clear and entirely free of precipitate.

*Example 2*

An aqueous concentrate comprising 67 per cent by weight of the triethanolamine salt of 2,4-dichlorophenoxy-acetic acid and an amount of methyl cellulose equal to 0.06 per cent by weight of the amine salt was prepared as described in Example 1. The methyl cellulose employed in this preparation had a viscosity of 15 centipoises in 2 per cent aqueous solution and at 20° C. Similarly, an unmodified concentrate containing 67 per cent by weight of the triethanol amine salt of 2,4-dichlorophenoxy-acetic acid was prepared.

The two concentrates were diluted with water having a hardness of 400 parts per million to produce sprays containing 2.08 pounds of the amine salt per 5 gallons of solution. These sprays were pumped at thirty pounds pressure, first through a meter for indicating the rate of flow of the solution in gallons per minute, and second through a nozzle containing a screen having 0.074 millimeter square openings (200 mesh). The orifice of the nozzle was calibrated to deliver about 0.075 gallon of water per minute at 30 pounds pressure. The rates of flow after various intervals of time for these two sprays are recorded in the following table:

| Spray Containing No Methyl Cellulose | | Spray Containing Methyl Cellulose | |
|---|---|---|---|
| Time in Minutes | Gallons of Spray Per Minute | Time in Minutes | Gallons of Spray Per Minute |
| 0 | 0.078 | 0 | 0.074 |
| 10 | 0.070 | 30 | 0.073 |
| 20 | 0.061 | 40 | 0.071 |
| 30 | 0.048 | 55 | 0.069 |
| 40 | 0.033 | 70 | 0.067 |
| 50 | 0.03 | | |

At the conclusion of these spraying operations, the equipment was dismantled. The screen through which the unmodified spray had been pumped was found to be completely covered with a reddish-brown sediment practically stopping the flow. The screen, through which the composition modified with methyl cellulose had passed, was found to be clean.

*Example 3*

Aqueous sprays were compounded both with and without the stabilizing methyl cellulose from different alkanolamine salts of chlorophenoxy-acetic acids. These sprays were produced from water having a hardness of 400 parts per million. The methyl cellulose employed had a viscosity of 15 centipoises in 2 per cent aqueous solution and at 20° C. Portions of each spray were placed in Nessler tubes having a diameter of 20 millimeters, and the tubes were set aside to permit the sedimentation of any insoluble materials. About 16 hours later, observations were carried out to ascertain the presence or absence of precipitates, which are recorded in the following table. For comparison, similar tests were run with the sodium and triethylamine salts of 2,4-dichlorophenoxy-acetic acid.

| Toxicant | Milliliters of Spray Employed | Composition of Spray | | | Amount of Precipitate | |
|---|---|---|---|---|---|---|
| | | Pounds of Amine Salt | Gallons of water | Amount of Methyl Cellulose in Per Cent by Weight of the Amine Salt in the Spray | After 16 hours | After 18 hours |
| 2-Methyl-1-hydroxy-isopropylamine salt of 2,4-dichlorophenoxy-acetic acid. | 55 | 10.6 | 20 | 0.072 | None | |
| | 55 | 10.6 | 20 | None | ⅟₁₆ inch | |
| Diethanolamine salt of 2,4-dichlorophenoxy-acetic acid. | 105 | 10.8 | 40 | 0.070 | None | |
| | 105 | 10.8 | 40 | None | ⅟₁₆ inch | |
| Triethanolamine salt of 2-chlorophenoxy-acetic acid. | 55 | 13.1 | 20 | 0.055 | None | |
| | 55 | 13.1 | 20 | None | Supended throughout solution. | |
| Triethanolamine salt of 4-chlorophenoxy-acetic acid. | 105 | 13.1 | 40 | 0.055 | | None. |
| | 105 | 13.1 | 40 | None | | Small amount. |
| Monoethanol-diisopropanolamine salt of 2,4-dichlorophenoxy-acetic acid. | 80 | 14.1 | 30 | 0.027 | | None. |
| | 80 | 14.1 | 30 | None | | Small amount. |
| Di- and tri-isopropanal mixed amine (equivalent weight of 140) salt of 2,4-dichlorophenoxy-acetic acid. | 80 | 12.2 | 30 | 0.031 | | None. |
| | 80 | 12.2 | 30 | None | | Small amount. |
| Monoethanol-diisopropanolamine salt of 2,4,5-trichlorophenoxy-acetic acid. | 105 | 0.22 | 30 | 0.3 | None | |
| | 105 | 0.22 | 30 | None | ⅟₃₂ inch | |
| Triethylamine salt of 2,4-dichlorophenoxy-acetic acid. | 105 | 6.9 | 20 | 0.034 | ⅟₁₆ inch | |
| | 105 | 6.9 | 20 | None | ⅟₁₆ inch | |
| Sodium salt of 2,4-dichlorophenoxy-acetic acid | 100 | 5.0 | 20 | 2.0 | ⅟₁₆ inch | |
| | 100 | 5.0 | 20 | None | ⅟₁₆ inch | |
| | 100 | 5.0 | 20 | 0.5 | ⅟₁₆ inch | |

Example 4

An aqueous concentrate was prepared containing 67 per cent by weight of the triethanolamine salt of 2,4-dichlorophenoxy-acetic acid. A part of this concentrate was diluted with a solution of methyl cellulose in the hard water described in Example 1 to produce a spray containing 12.2 pounds of the amine salt and 0.03 pound of methyl cellulose, in 20 gallons of solution. This amount of methyl cellulose was equal to 0.25 per cent by weight of the triethanolamine salt present. The methyl cellulose employed had a viscosity of 100 centipoises in 2 per cent aqueous solution at 20° C. A further sample of the concentrate was diluted with the hard water to produce an unmodified spray containing 12.2 pounds of the amine salt per 20 gallons of solution. 55 milliliter portions of these sprays were placed in Nessler tubes and examined for sedimentation as described in Example 3. After 16 hours' standing, $\frac{1}{8}$ inch of fluocculent precipitate was in the sample from the unmodified spray. The spray comprising the amine salt and methyl cellulose was clear and entirely free of precipitate.

We claim:

1. An aqueous herbicide spray composition comprising an alkanolamine salt of a chlorophenoxy-acetic acid as a principal toxic ingredient and a water-soluble methyl cellulose in the amount of at least 0.01 per cent by weight of the amine salt present in the composition.

2. An aqueous herbicide spray composition comprising an alkanolamine salt of a chlorophenoxy-acetic acid as a principal toxic ingredient and a water-soluble methyl cellulose in the amount of at least 0.01 per cent by weight of the amine salt present in the composition, the methyl cellulose being characterized by a viscosity of from 10 to 100 centipoises in 2 per cent by weight aqueous solution and at 20° C.

3. An aqueous herbicide spray composition comprising an alkanolamine salt of 2,4-dichlorophenoxy-acetic acid as a principal toxic ingredient and a water-soluble methyl cellulose in the amount of at least 0.01 per cent by weight of the amine salt present in the composition.

4. An aqueous herbicide spray composition comprising an ethanolamine salt of 2,4-dichlorophenoxy-acetic acid as a principal toxic ingredient and methyl cellulose in the amount of at least 0.01 per cent by weight of the amine salt present in the composition, the methyl cellulose being characterized by a viscosity of from 10 to 100 centipoises in 2 per cent by weight aqueous solution and at 20° C.

5. An herbicide concentrate comprising an alkanolamine salt of a chlorophenoxy-acetic acid and a water-soluble methyl cellulose in the amount of at least 0.01 per cent by weight of the amine salt present in the concentrate.

6. An herbicide concentrate comprising an aqueous solution of an alkanolamine salt of a chlorophenoxy-acetic acid, and a water-soluble methyl cellulose in the amount of at least 0.01 per cent by weight of the amine salt present in the concentrate.

7. An herbicide concentrate comprising an aqueous solution of an alkanolamine salt of 2,4-dichlorophenoxy-acetic acid, and a water-soluble methyl cellulose in the amount of at least 0.01 per cent by weight of the amine salt present in the composition, the methyl cellulose having a viscosity of from 10 to 100 centipoises in 2 per cent by weight aqueous solution and at 20° C.

8. An herbicide concentrate comprising an aqueous solution of an ethanolamine salt of 2,4-dichlorophenoxy-acetic acid, and a water-soluble methyl cellulose in the amount of at least 0.01 per cent by weight of the amine salt present in the composition, the methyl cellulose having a viscosity of from 10 to 100 centipoises in 2 per cent by weight aqueous solution and at 20° C.

9. An aqueous herbicide spray composition comprising an alkanolamine salt of 2,4,5-trichlorophenoxy-acetic acid as a principal toxic ingredient and a water-soluble methyl cellulose in the amount of at least 0.01 per cent by weight of the amine salt present in the composition.

ROBERT C. DOSSER.
AMERST E. COLBY.

REFERENCES CITED

The following references are of record in the file of this patent:

UNITED STATES PATENTS

| Number | Name | Date |
|---|---|---|
| 1,719,944 | Risse | July 9, 1929 |
| 2,216,045 | Powers | Sept. 24, 1940 |
| 2,390,941 | Jones | Dec. 11, 1945 |
| 2,416,460 | Smith | Feb. 25, 1947 |

OTHER REFERENCES

Science, July 1947, page 87.
Amer. Prof. Pharm., Dec. 1939, page 692.
Botanical Gazette 105 (1944), pages 474–483.